United States Patent [19]

Plummer

[11] 4,388,747
[45] Jun. 21, 1983

[54] ONE-PIECE MOLDED TOGGLE CLAMP

[76] Inventor: Walter A. Plummer, 3546 Crown Ridge Dr., Sherman Oaks, Calif. 91403

[21] Appl. No.: 291,283

[22] Filed: Aug. 10, 1981

[51] Int. Cl.³ .............................................. A44B 21/00
[52] U.S. Cl. .................................. 24/255 SL; 24/257; 24/258
[58] Field of Search ........... 24/255 SL, 255 R, 252 R, 24/256, 257, 258, 250, 249 R, 248 B

[56] References Cited

U.S. PATENT DOCUMENTS 3,496,616  2/1970  Vazquez ................................ 24/258
3,616,497  11/1971  Esposito, Jr. ......................... 24/257

Primary Examiner—Jay N. Eskovitz
Attorney, Agent, or Firm—Sellers and Brace

[57] ABSTRACT

A one-piece molded plastic clamp having a pair of toggle members interconnecting the clamp jaws and swingable between jaw-open and locked jaw-closed positions. The jaws and toggle members are all flexibly connected by live hinges.

9 Claims, 4 Drawing Figures

U.S. Patent   Jun. 21, 1983   4,388,747
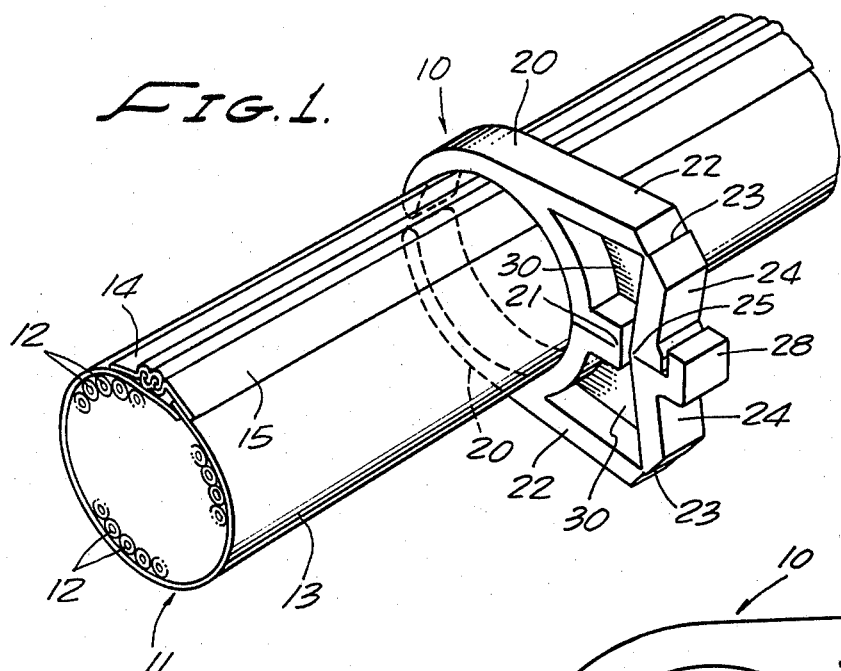
FIG.1.
FIG.2.
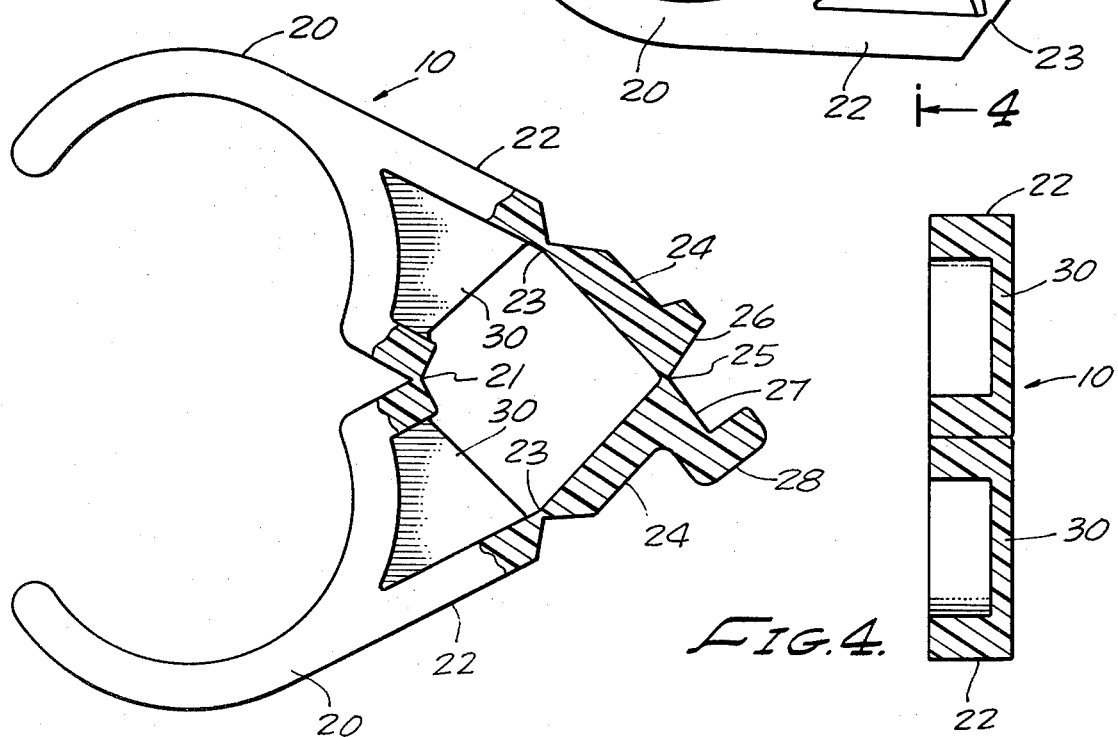
FIG.3.
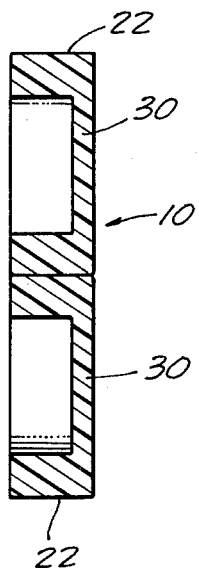
FIG.4.

ONE-PIECE MOLDED TOGGLE CLAMP

This invention relates to clamping devices, and more particularly to a unique one-piece molded clamp having a pair of toggle members operable to lock the clamp closed.

SUMMARY OF THE INVENTION

There is provided by this invention a simple toggle clamp molded in one piece from suitable plastic material and all parts of which are pivotally interconnected by thin flexible webs providing highly satisfactory long-life hinges commonly known in the plastic art as live hinges. The clamp jaws are hingedly connected to one another between their opposite ends and one pair of these ends is hingedly connected by a pair of toggle members shiftable past dead center and between the open position of the clamped jaws and the firmly locked, closed position thereof. When closed, the toggle members are seated against a stop and are readily opened by grasping the toggle members and pulling them outwardly past dead center, an operation facilitated by the presence of a finger tang on one of the toggle members.

It is therefore a primary object of the present invention to provide a unique toggle clamp having a plurality of members movably interconnected by live hinges.

Another object of the invention is the provision of one-piece toggle clamp molded in one unitary assembly from plastic material.

Another object of the invention is the provision of a one piece plastic clamp having the jaws thereof hingedly connected and movable between a fully open position and a firmly locked closed position by a pair of toggle members.

Another object of the invention is the provision of a one piece toggle clamp having a pair of arcuate jaws effective when closed to surround tubing, ducting or the like, and movable between a closed locked position and an open position completely encompassing the ducting or cabling and movable between fully closed and fully open positions under the control of a pair of toggle members and wherein all relatively movable parts are interconnected by live hinges.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view of an illustrative embodiment of the invention toggle clamp in closed locked position about a length of cabling;

FIG. 2 is a side view on an enlarged scale showing the clamp closed;

FIG. 3 is a view similar to FIG. 2 but showing the clamp substantially fully open; and FIG. 4 is a cross sectional view taken along line 4—4 on FIG. 2.

Referring to FIGS. 1-4, there is shown an illustrative embodiment of the invention clamp, designated generally 10, as designed for use about a cylindrical object such as ducting or cabling 11. As there shown, the cabling comprises a plurality of conductors 12 held snugly confined enclosed within flexible plastic jacketing 13 provided with a pair of interlocking seam forming members 14, 15. These seam members are of a well known type extruded from flexible plastic material having interlocking tongues and grooves such as those shown in my U.S. Pat. No. 2,960,561. Such seams remain reliably interlocked with one another unless subjected to rough handling or when subjected to frequent or sharp bending of the cabling as a whole. Under such operating conditions it is sometimes desirable to encircle the jacketed cabling with clamps to relieve the seam itself from high stress tending to open the seam. Not infrequently it is desirable to install such clamps after the cabling has been installed in cramped quarters limiting free access to the cabling.

The one-piece clamp 10 embodying the principles of this invention is particularly advantageous in meeting these needs as will be appreciated from the following detailed description of its construction and operating principles. It will of course be appreciated that the particular application of the clamp illustrated in FIG. 1 is merely illustrative of many, many environments wherein the clamp fulfills needs not readily satisfied by prior clamp designs.

Clamp 10 is preferably molded in one piece from a plastic such a polypropylene well known to provide excellent integral live hinges interconnecting portions of components of thicker substantially rigid properties. The one-piece clamp includes a pair of elongated jaws 20—20 pivotally interconnected between one pair of adjacent ends by a single live hinge 21 lying in a bisector plane extending longitudinally of the clamp. As herein shown, the free ends of the jaws are substantially semi-circular so as to cooperate with one another to embrace a cylindrical object such as ducting, cabling or the like. However, jaws and particularly the interior facing surfaces may take any of countless contours to accommodate the particular article or articles to be clamped therebetween.

The rearwardly projecting ends 22, 22 of the jaws terminate beyond hinge 21 and are connected by live hinges 23, 23 to the remote ends of a pair of toggle members 24, 24 and the adjacent ends of members 24 are connected together by a common live hinge 25. The combined length of members 24, 24 is slightly greater than the straight line distance between the axes of live hinges 23, 23 when the clamp jaws are fully closed. Consequently, the toggle members are under slight longitudinal compression when the clamp is locked in its closed position as illustrated in FIGS. 1 and 2. It is also pointed out that the adjacent end surfaces 26, 27 of the toggle members are in abutment with one another and cooperate in forming a stop limiting the pivotal movement of members 24 to the left as viewed in FIG. 2 in which position the clamp is firmly locked closed. At this time hinge 25 lies in a plane slightly past dead center and to the left of a place through the axes of hinges 23, 23.

A finger grip tang 28 is intergral with one of the toggle members 24 and may be gripped by the operator to facilitate both opening and closing of the toggle. The rear ends 22 of the clamp jaws are preferably strengthened by a connecting web 30, joining them to the portion of the clamp jaws interconnected by live hinge 21. These webs are in tension when the toggle members are in closed position and effective to prevent outward divergence of jaw legs 22, 22.

In use, jaws 20, 20 are readily opened widely simply by grasping the finger tang 28 and pulling the toggle members outwardly away from the live hinge 21. The jaws freely pivot away from one another to facilitate the assembly of the clamp about any object to be gripped between. Once in place the clamp is closed by pressing the jaws toward one another and/or by closing the toggle member 24, 24 to the position shown in FIG. 4. As hinge 25 presses inwardly past a plane through hinges 23, 23, the toggle quickly and firmly snaps to its fully closed position shown in FIG. 2, thereby locking the clamp positively closed, the clamp remains securely in this position until the toggle members are again opened by pulling them outwardly away from hinge 21.

While the particular one-piece toggle molded clamp herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A toggle clamp formed in one piece from plastic material suitable for use in forming a live hinge, said clamp comprising:

a pair of elongated jaws having one pair of ends lying in a bisector plane longitudinally of said clamp and interconnected by a single live hinge for pivotal movement of said jaws toward and away from one another; and a pair of toggle members having a first pair of adjacent ends interconnected by a common live hinge and their remote ends connected to opposed ends of a respective one of said jaws by separate live hinges, said jaws being movable between a freely pivotable open position and immovable closed position as said toggle members are pivoted to shift said common live hinge from an open position remote from said single live hinge to a closed jaw-locking position between said single live hinge and a straight line through said hinges connecting said toggle members to said jaws.

2. A toggle clamp as defined in claim 1 characterized in that said jaws are arched away from one another.

3. A toggle clamp as defined in claim 1 characterized in that said jaws are shaped when locked closed to substantially embrace an object positioned therebetween.

4. A toggle clamp as defined in claim 1 characterized in the provision of stop means for limiting the movement of said toggle members toward said first live hinge and closely beside said straight line through the hinges interconnecting said jaws and said toggle members.

5. A toggle clamp as defined in claim 4 characterized in that said stop means includes portions of the adjacent ends of said toggle members spaced on the opposite side of said common live hinge remote from said single live hinge.

6. A toggle clamp as defined in claim 1 characterized in the provision of tang means on one of said toggle members engageable to pivot said toggle members between said open and closed position thereof.

7. A toggle clamp as defined in claim 1 characterized in that said jaws are shaped when closed to substantially surround ducting, cabling and the like, and said toggle members being sized and operable to permit the ends of said jaws remote from said single live hinge to open away from one another by a distance sufficient to permit ducting, cabling and the like to be received between and embraced thereby.

8. A toggle clamp as defined in claim 1 characterized in that the same is molded polypropylene.

9. A toggle clamp as defined in claim 1 characterized in that the remote ends of said toggle members are hingedly connected to said jaws at points spaced substantially to the opposite lateral sides of said single hinge.

* * * * *